(12) United States Patent
Chiang (10) Patent No.: US 7,395,577 B2
(45) Date of Patent: Jul. 8, 2008

(54) UNIVERSAL CONNECTION DEVICE FOR WINDSHIELD WIPER BLADE

(75) Inventor: Min-Heng Chiang, Taipei Hsien (TW)

(73) Assignee: Fu Gang Co., Ltd., Taipei Hsien (TW)

( * ) Notice: Subject to any disclaimer, the term of this patent is extended or adjusted under 35 U.S.C. 154(b) by 202 days.

(21) Appl. No.: 11/458,395

(22) Filed: Jul. 19, 2006

(65) Prior Publication Data

US 2008/0058195 A1    Mar. 6, 2008

(51) Int. Cl.
    *B60S 1/40*    (2006.01)
(52) U.S. Cl. .................... 15/250.32; 15/250.43
(58) Field of Classification Search .......... 15/250.32, 15/250.31, 250.43, 250.44, 250.361; 403/24, 403/119, 154, 161
    See application file for complete search history.

(56) References Cited

U.S. PATENT DOCUMENTS 5,332,328 A * 7/1994 Yang .................. 403/154

7,159,267 B2 * 1/2007 Son .................... 15/250.201

FOREIGN PATENT DOCUMENTS

EP    1820705    *  8/2007
JP    3-136957   *  6/1991

* cited by examiner

*Primary Examiner*—Gary K Graham
(74) *Attorney, Agent, or Firm*—Leong C. Lei (57) ABSTRACT

A universal connection device mainly contains a cover member having two opposing and parallel walls. The height of each wall decreases gradually towards a front end in a front section and decreases more sharply towards a back end in a back section. Within a middle section between the front and back sections, each wall has a number of through holes of different apertures and a number of protrusions on the inner surface. On top of and between the front sections of the two walls, a liftable tab is provided. The connection device further contains an elongated piece attached to one of the walls of the cover member. The piece has a curved outer surface and a rod on an inner surface for embedding into one of the holes of the cover member.

2 Claims, 9 Drawing Sheets

UNIVERSAL CONNECTION DEVICE FOR WINDSHIELD WIPER BLADE

BACKGROUND OF THE INVENTION (a) Technical Field of the Invention

The present invention generally relates to the connection device for joining a wiper blade to a wiper arm, and more particularly to a universal connection device for joining a wiper blade to various types of wiper arms.

(b) Description of the Prior Art

Figure 1:
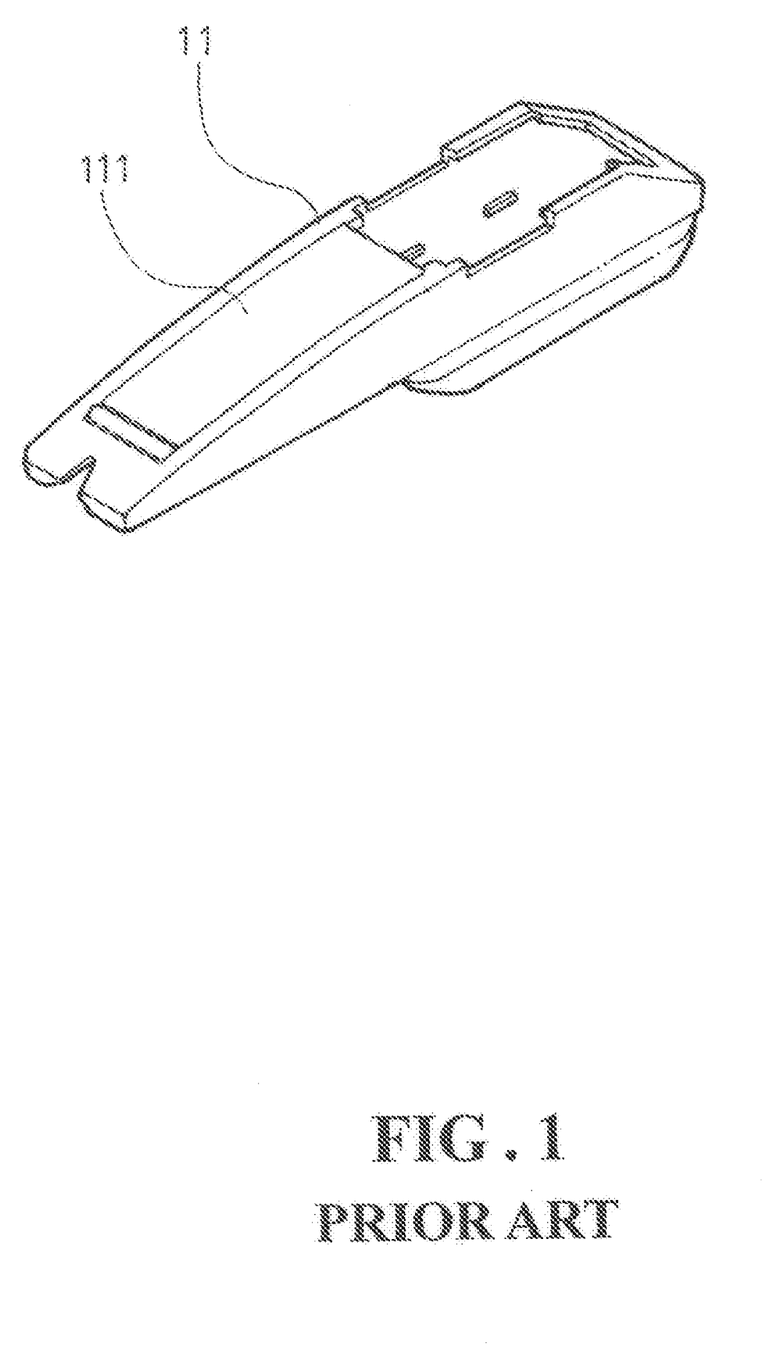
FIG. 1 is a perspective view showing a conventional connection device.
Figure 2:
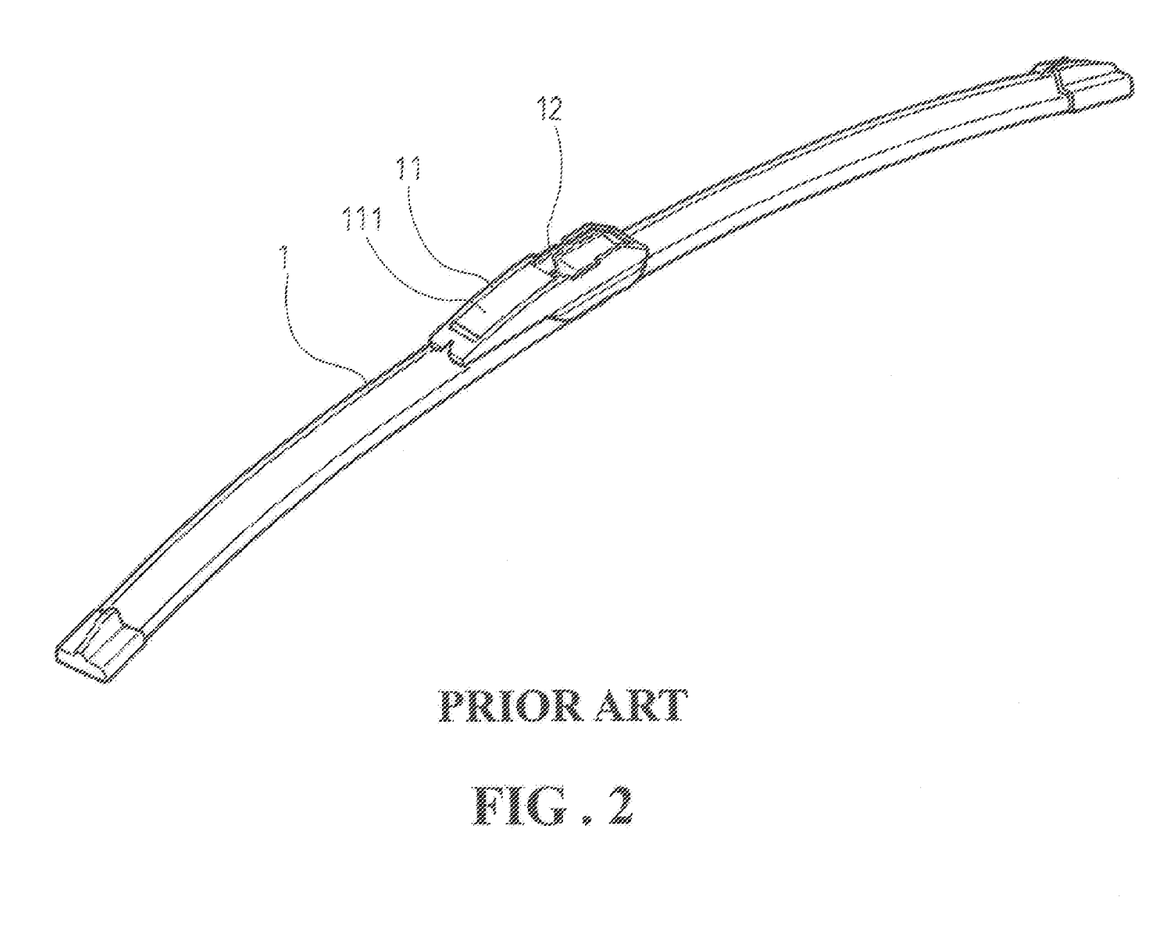
FIG. 2 is a perspective view showing the conventional connection device of FIG. 1 positioned on a wiper blade.

Beam blades or bracketless blades are the most popular windshield wiper blades of recent days. A typical beam blade 1 is shown in FIGS. 1 and 2 which has a connection seat 12 configured in a middle section of the wiper blade 1. The connection seat 12 is then fixedly embedded inside a connection device 11 which in turn is joined to a wiper arm (not shown). The connection device 11 usually contains a tab 111 which is pressed or lifted to release the wiper blade (including the connection device 11) from the wiper arm. The connection device 11 is often designed for a specific type of wiper arms such as those having a hook at the end. A wiper blade 1 having the connection device 11 is therefore cannot be mounted on different types of wiper arms such as those using a pin for attachment. As such, different types of connection devices 11 have to be designed and manufactured so as to fit on different kinds of wiper arms, which is not efficient and economical from a production point of view.

SUMMARY OF THE INVENTION

The primary purpose of the present invention is to provide a universal connection device which a same wiper blade can be mounted onto different types of wiper arms.

The connection device mainly contains a cover member having two opposing and parallel walls. The height of each wall decreases gradually towards a front end in a front section and decreases more sharply towards a back end in a back section. Within a middle section between the front and back sections, each wall has a number of through holes of different apertures and a number of protrusions on the inner surface. On top of and between the front sections of the two walls, a liftable tab is provided. The connection device further contains an elongated piece attached to one of the walls of the cover member. The piece has a curved outer surface and a rod on an inner surface for embedding into one of the holes of the cover member.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 3:
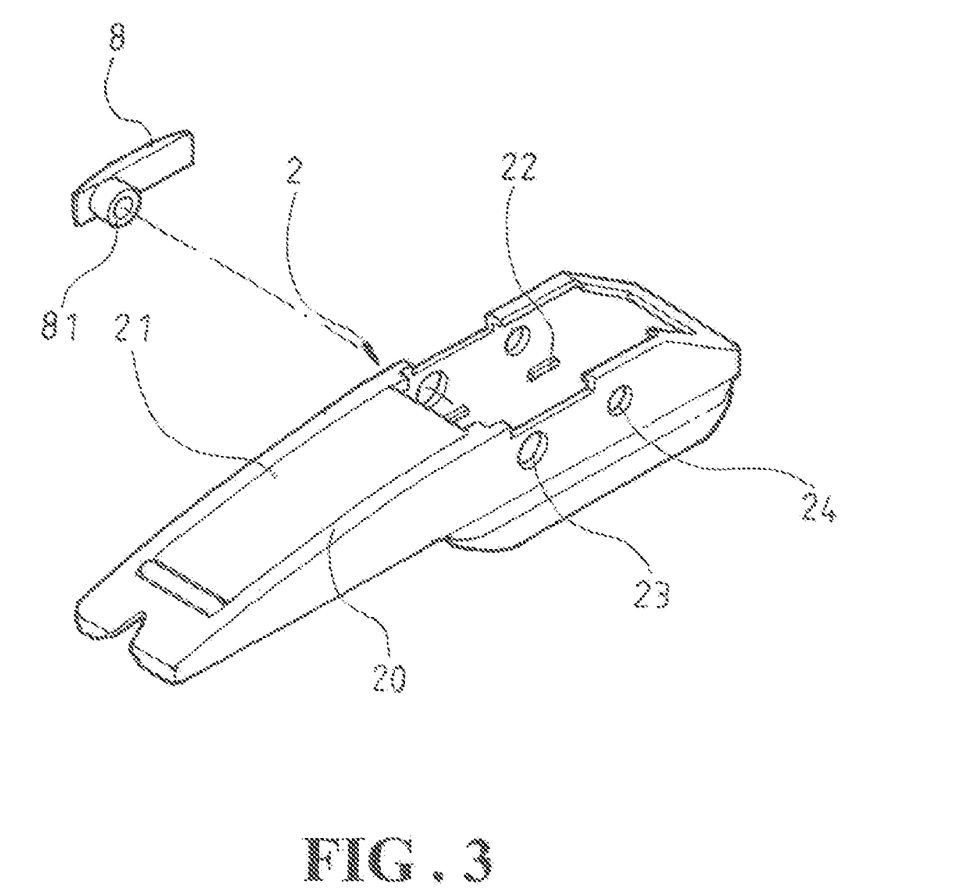
FIG. 3 is a perspective view showing a connection device according to an embodiment of the present invention.
Figure 4:
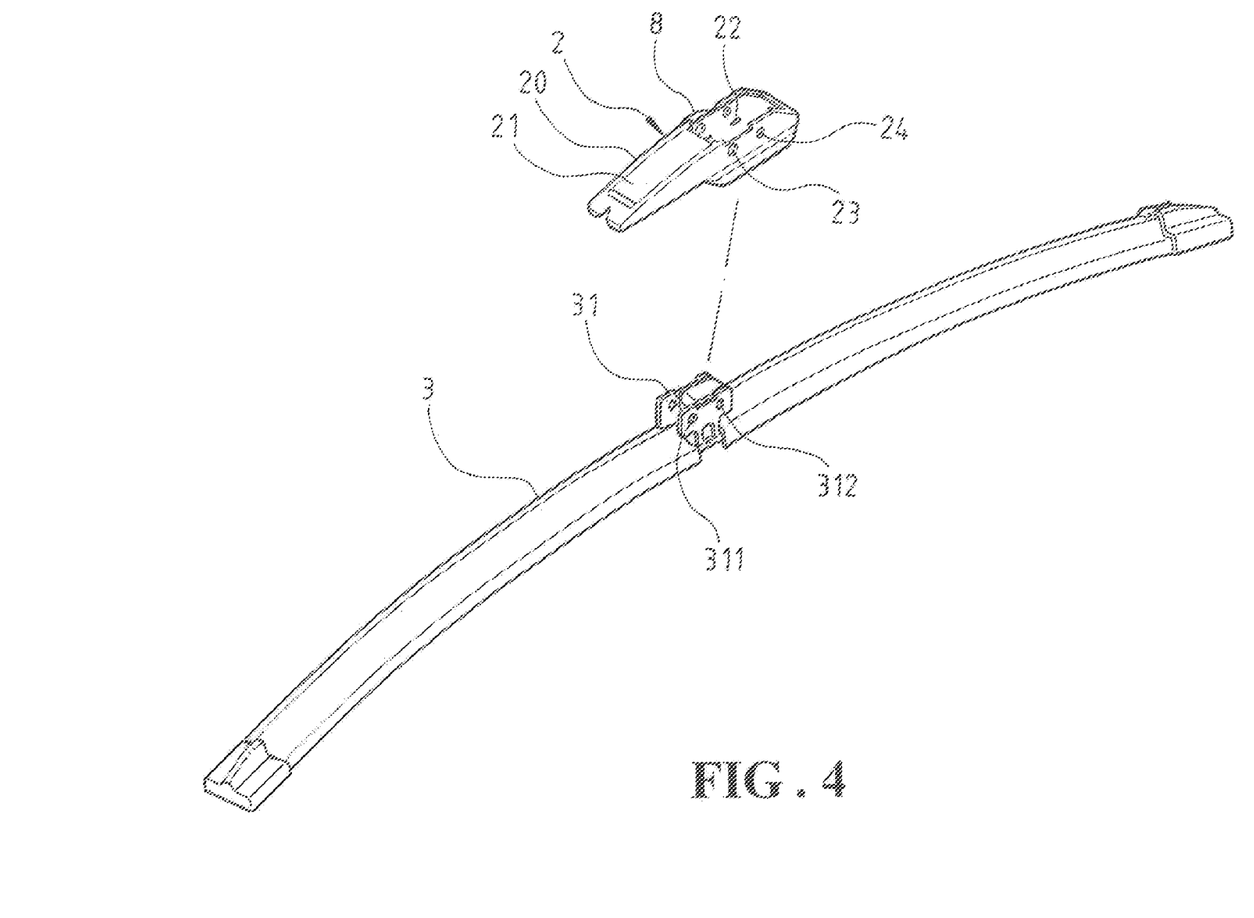
FIG. 4 is perspective view showing the connection device of FIG. 3 positioned on a wiper blade.

As shown in FIGS. 3 and 4, a connection device 2 according to an embodiment of the present invention mainly contains a cover member 20 having an elongated box-like shape with both its top and bottom opened. The cover member 20 mainly has two opposing and parallel walls along the elongated sides. The height of each wall decreases gradually towards a front end in a front section and decreases more sharply towards a back end in a back section. Within a middle section between the front and the back sections, each wall has a number of through holes 23 and 24 of different apertures and a number of protrusions 22 on the inner surface. On top of and between the front sections of the two walls, a liftable tab 21 is provided. As shown in FIG. 4, a wiper blade 3 has a connection seat 31 in the middle of the blade body. The connection seat 31 contains two opposing and parallel T-shaped plates each having a plurality of through holes 311 and 312 at corresponding locations. The connection seat 31 is configured such that it can be embedded between the middle sections of the two walls of the cover member 20 and, after that, the through holes 23 and 24 of the cover member 20 and the through holes 311 and 312 of the connection seat 31 are matched respectively. The connection device 2 further contains an elongated piece 8 attached to one of the walls of the cover member 20. The piece 8 has a curved outer surface and a rod 81 on an inner surface for embedding into the hole 23.

Based on the foregoing structure, when the connection device 2 is forced onto the connection seat 31, the protrusions 22 will be positioned right beneath the bottom rim of the horizontal portion of each T-shaped plate so that the connection device 2 and the connection seat 31 are securely locked together. As mentioned earlier, the through holes 23 and 24 of the cover member 20 and the through holes 311 and 312 of the connection seat 31 will be aligned and matched as such.

Figure 5:
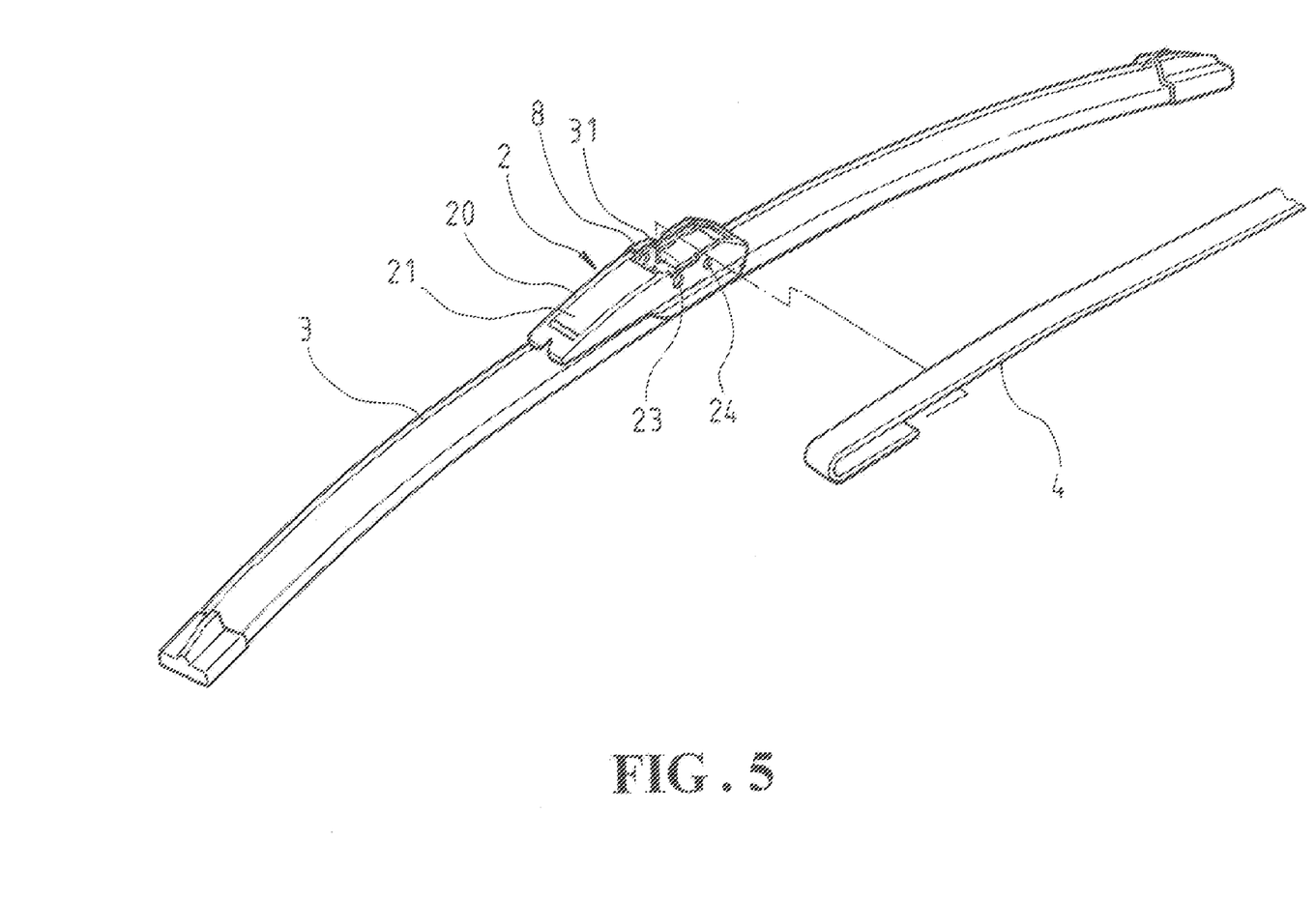
FIG. 5 is perspective view showing the connection between a wiper blade having the connection device or FIG. 3 and a hook-typed wiper arm.

As shown in FIG. 5, to join the wiper blade 3 to a hook-typed wiper arm 4, the tab 21 is lifted up to allow the hooked end of the wiper arm 4 to enter from above into the space between the walls of the cover member 20. Then, the wiper blade 3 along with the connection device 2 is slid towards the front so that the portion of the connection seat 31 between its two plates is embedded into the wiper arm 4's hook. Then, the tab 21 is pressed back to its original position, to lock the connection of the wiper blade 3 and the wiper arm 4.

Figure 6:
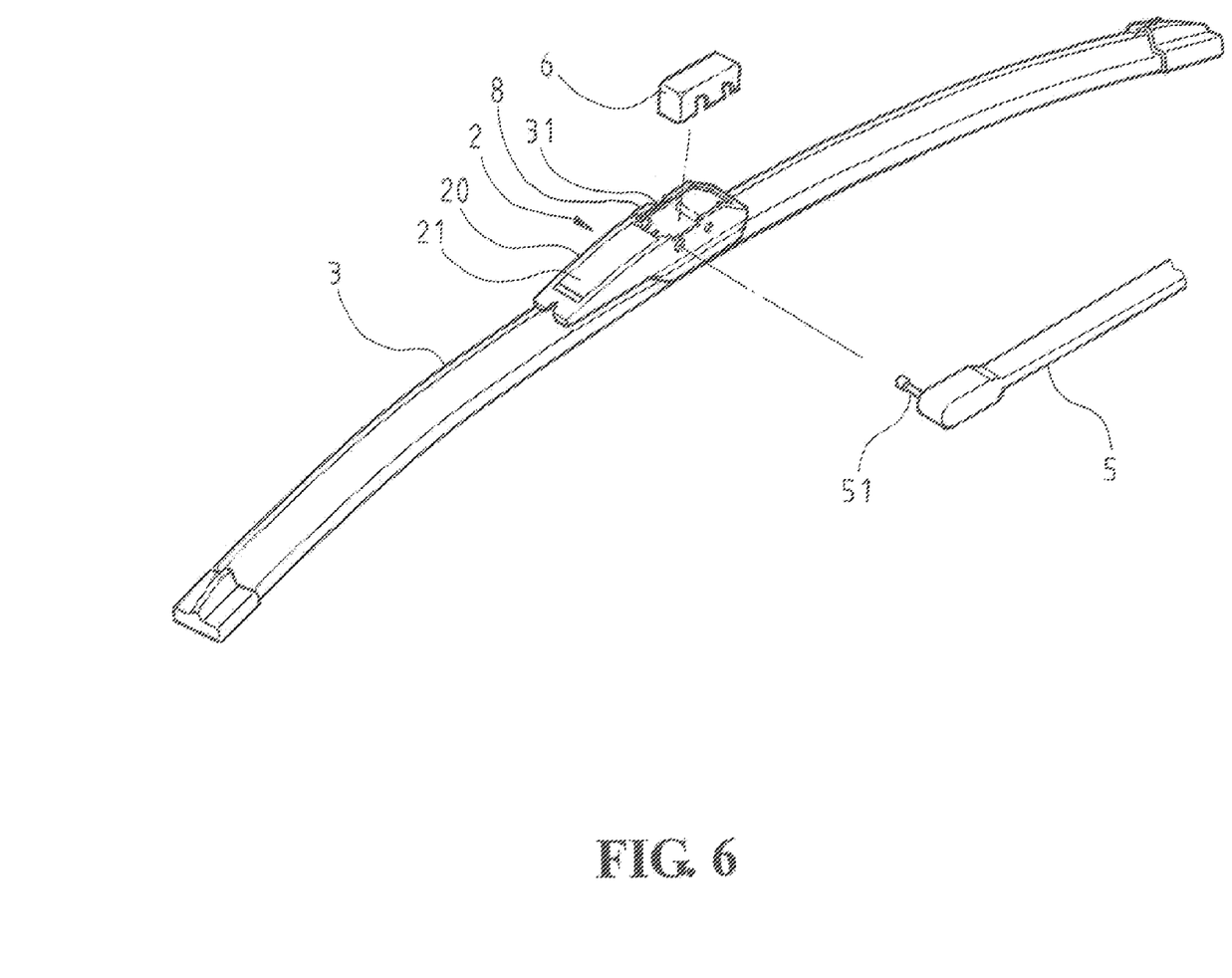
FIG. 6 is perspective view showing the connection between a wiper blade having the connection device of FIG. 3 and a pin-typed wiper arm.

As shown in FIG. 6, to join the wiper blade 3 to a pin-typed wiper arm 5, the tab 21 is lifted up and a pin 51 provided on the head of the wiper arm 4 penetrates through the cover member 20 and the connection seat 31 via the through holes 311 and the through holes 23. Then, a locking piece 6 is installed between the walls of the cover member 20 so that the pin 51 is embedded inside the locking piece 6. Then, the tab 21 is pressed back to its original position to lock the connection of the wiper blade 3 and the wiper arm 5.

Please note that a number of through holes 23 and 24 of different apertures are provided on the walls of the connection device 2 so that various hook-typed or pin-typed wiper arms can be supported by the present invention.

Figure 7:
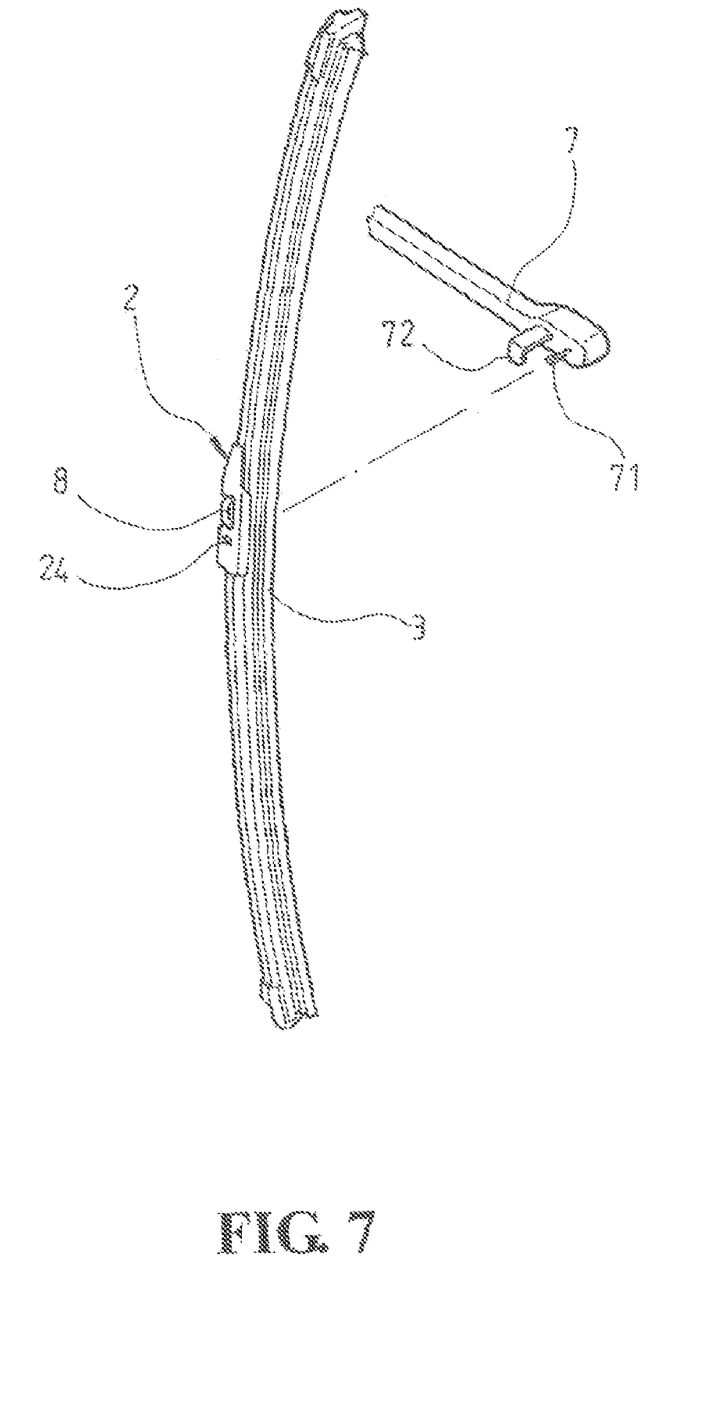
FIGS. 7, 8, and 9 are perspective views showing the connection between a wiper blade having the connection device of FIG. 3 and a specific wiper arm.
Figure 8:
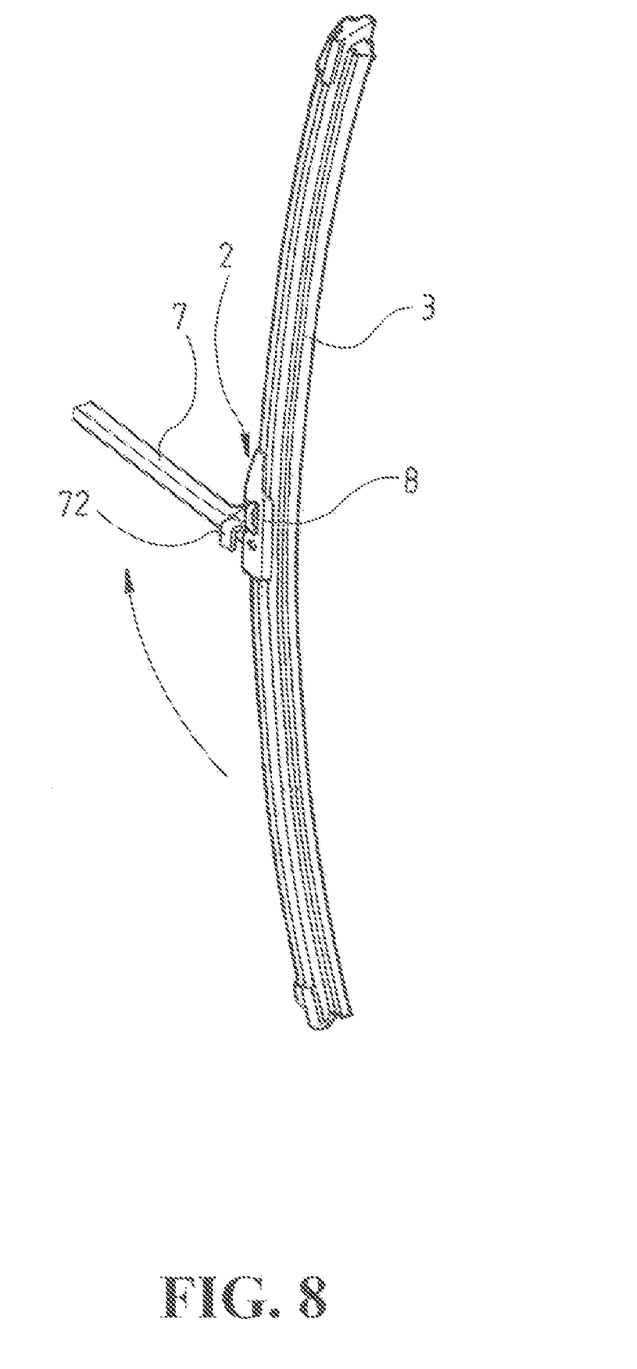
Figure 9:
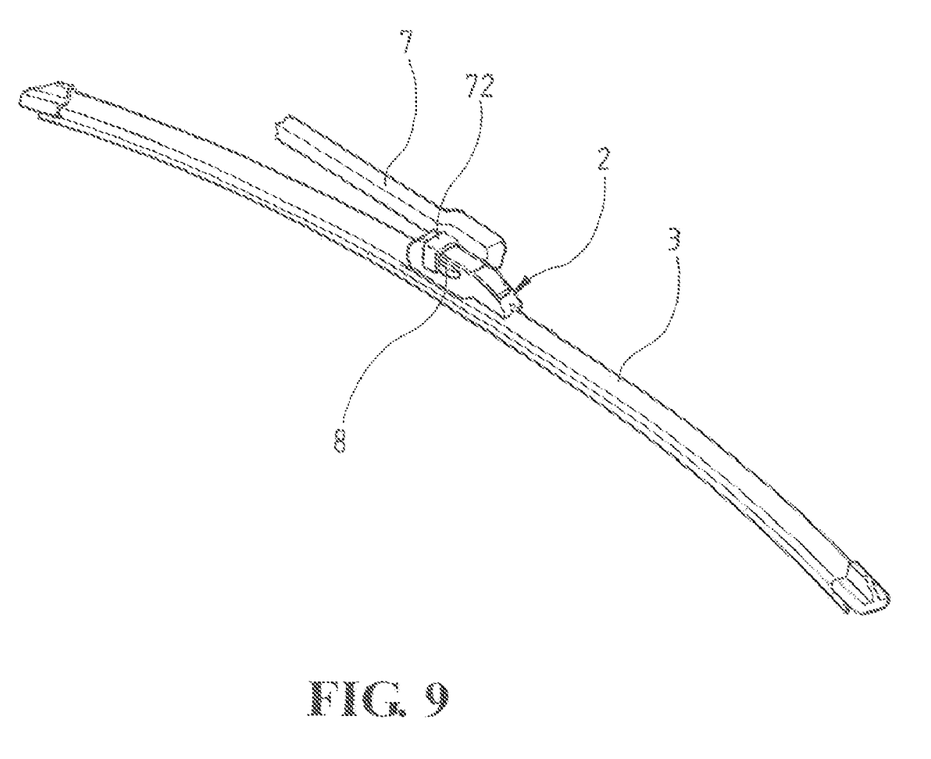

As shown in FIGS. 7, 8, and 9, the connection device 2 can be used to fit on a specific type of wiper arm 7. The wiper arm 7 is similar to a pin-typed wiper arm that has a pin 71 on the head. Then, below the pin 71 and along the wiper arm 7, an L-shaped hook 72 is provided. To join the wiper blade 3 to the wiper arm 7, the blade 3 is first held perpendicularly to the wiper arm 7. The pin 71 then penetrates through the cover member 20 and the connection seat 31 via the through holes 311 and the through holes 23 Then, the wiper blade 3 is swung to become parallel to the wiper arm 7. As such, the curved surface of the piece 8 would be tightly pressed against the hook 72 so that the wiper blade 3 and the wiper arm 7 are securely joined together.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A connection device for joining a wiper blade to a wiper arm, said wiper blade having a connection seat with a plurality of first through holes, said connection device comprising:

a cover member having an elongated box-like shape with both its top and bottom opened, said cover member having two opposing and parallel walls along the elongated sides, the height of each said wall decreasing gradually towards a front end in a front section and decreasing more sharply towards a back end in a back section, within a middle section between said front and back sections, each said wall has a plurality of second through holes of different apertures and a plurality of protrusions on the inner surface, a liftable tab being provided on top of and between said front sections of said two walls;

wherein said cover member is configured such that it can be fitted on said connection seat and said second through holes of said cover member and said first through holes of said connection seat are matched respectively.

2. The connection device according to claim 1, further comprising an elongated piece attached to one of said wails of said cover member; and said piece has a curved outer surface and a rod on an inner surface for embedding into one of said second through holes of said cover member.

* * * * *